United States Patent [19]

Simmonds

[11] Patent Number: 5,494,143
[45] Date of Patent: Feb. 27, 1996

[54] MULTIPLATE CLUTCH

[75] Inventor: Robert A. Simmonds, Leamington Spa, Great Britain

[73] Assignee: Automotive Produts, plc, Leamington Spa, England

[21] Appl. No.: 256,817

[22] PCT Filed: Nov. 26, 1993

[86] PCT No.: PCT/GB93/02444

§ 371 Date: Jul. 25, 1994

§ 102(e) Date: Jul. 25, 1994

[87] PCT Pub. No.: WO94/12802

PCT Pub. Date: Jun. 9, 1994

[30] Foreign Application Priority Data

Nov. 27, 1992 [GB] United Kingdom .............. 92 24 843.4

[51] Int. Cl.⁶ .................................................... F16D 13/75
[52] U.S. Cl. ..................... 192/70.25; 192/111 R
[58] Field of Search ............................ 192/70.25, 70.26, 192/111 R, 111 B

[56] References Cited

U.S. PATENT DOCUMENTS

| | | | |
|---|---|---|---|
| 1,131,769 | 3/1915 | Borg | 192/111 R |
| 1,330,965 | 2/1920 | White | 192/111 X |
| 1,402,129 | 1/1922 | Wood | 192/70.25 X |
| 1,455,587 | 5/1923 | Hamilton | 192/111 R |
| 1,746,805 | 2/1930 | Vail | 192/111 R |
| 5,320,205 | 6/1994 | Kummer et al. | 192/70.25 |
| 5,404,979 | 4/1995 | Craft et al. | 192/70.25 |

*Primary Examiner*—Richard M. Lorence
*Attorney, Agent, or Firm*—Paul E. Milliken; Lee A. Germain

[57] ABSTRACT

A friction clutch having a flywheel, a cover fixed to the flywheel, a plurality of fiction plates which are biased together by a spring acting between the cover, and a pressure plate to clamp the friction plates together between the flywheel and the pressure plate. At least one secondary plate is mounted on the flywheel or the pressure plate adjacent a respective friction plate. The secondary plate rotates with the cover and flywheel and is displaceable relative to the flywheel or pressure plate to compensate for friction plate wear, by adjustment of the clamping height between the pressure plate and flywheel.

12 Claims, 6 Drawing Sheets

MULTIPLATE CLUTCH

This invention relates to multiplate friction clutches, and in particular to clutches for use on motor vehicles, more particularly for use on high performance vehicles such as racing cars or motorcycles.

A typical multiplate friction clutch comprises a flywheel, a cover fixed to the flywheel, and a plurality of friction plates which are biased together by a spring means acting between the cover and a pressure plate to clamp the friction plates together between the pressure plate and the flywheel. Such a clutch will hereinafter be referred to as a clutch of the kind referred.

A friction clutch of the type referred when used in high performance vehicles, must be capable of maintaining a high clamping load on the friction plates throughout the lifetime of the clutch as the friction plates wear.

In order to compensate for the wear of the friction plates, the clutch is supplied with pressure plates of different thicknesses so that as the friction plates wear, different pressure plates of increasing thickness are incorporated into the clutch. This is a lengthy procedure which requires a strip down and rebuild of the multiplate clutch, with care being taken to use the correct thickness of pressure plate corresponding to the particular wear condition of the friction plates.

The present invention provides a multi plate friction clutch that can compensate for wear to the friction plate without requiring a strip down and rebuild.

According to the invention there is provided a friction clutch of the kind referred, wherein at least one secondary plate is mounted on at least one of the flywheel and pressure plate adjacent a respective friction plate, the secondary plate being held rotationally fast with the cover and flywheel and being displaceable relative to the flywheel or pressure plate to compensate for friction plate wear, by adjustment of clamping height between the pressure plate and flywheel.

Preferably the secondary plate is mounted on the flywheel, and preferably there is further provided an adjuster plate located axially between the secondary plate and the flywheel, the adjuster plate being capable of selected rotational displacement relative to flywheel, for adjustment and axial displacement of the secondary plate.

Preferably the adjuster plate has at least one inclined surface therein which cooperates with an opposed inclined surface on the secondary plate such that relative rotation of adjuster plate to the secondary causes the two inclined surfaces to move up each other thereby axially displacing the secondary plate.

In another embodiment, the secondary plate is preferably mounted on the flywheel by a screw adjustable means.

In yet another embodiment the secondary plate is connected to the flywheel through circumferentially spaced axial struts, the overall length of which is adjustable.

The invention will be described by way of example and with reference to the accompanying drawings in which.

Figure 1:
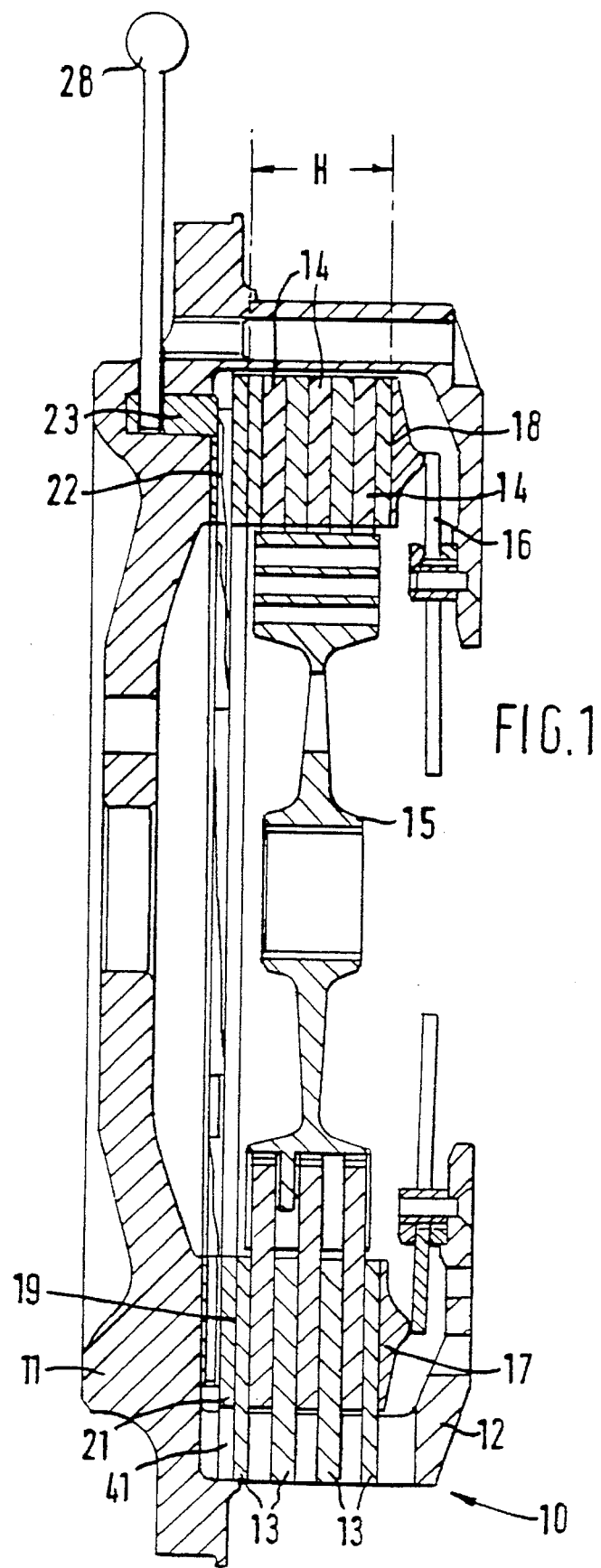
FIG. 1 is a section through a multiplate friction clutch according to the invention.
Figure 2:
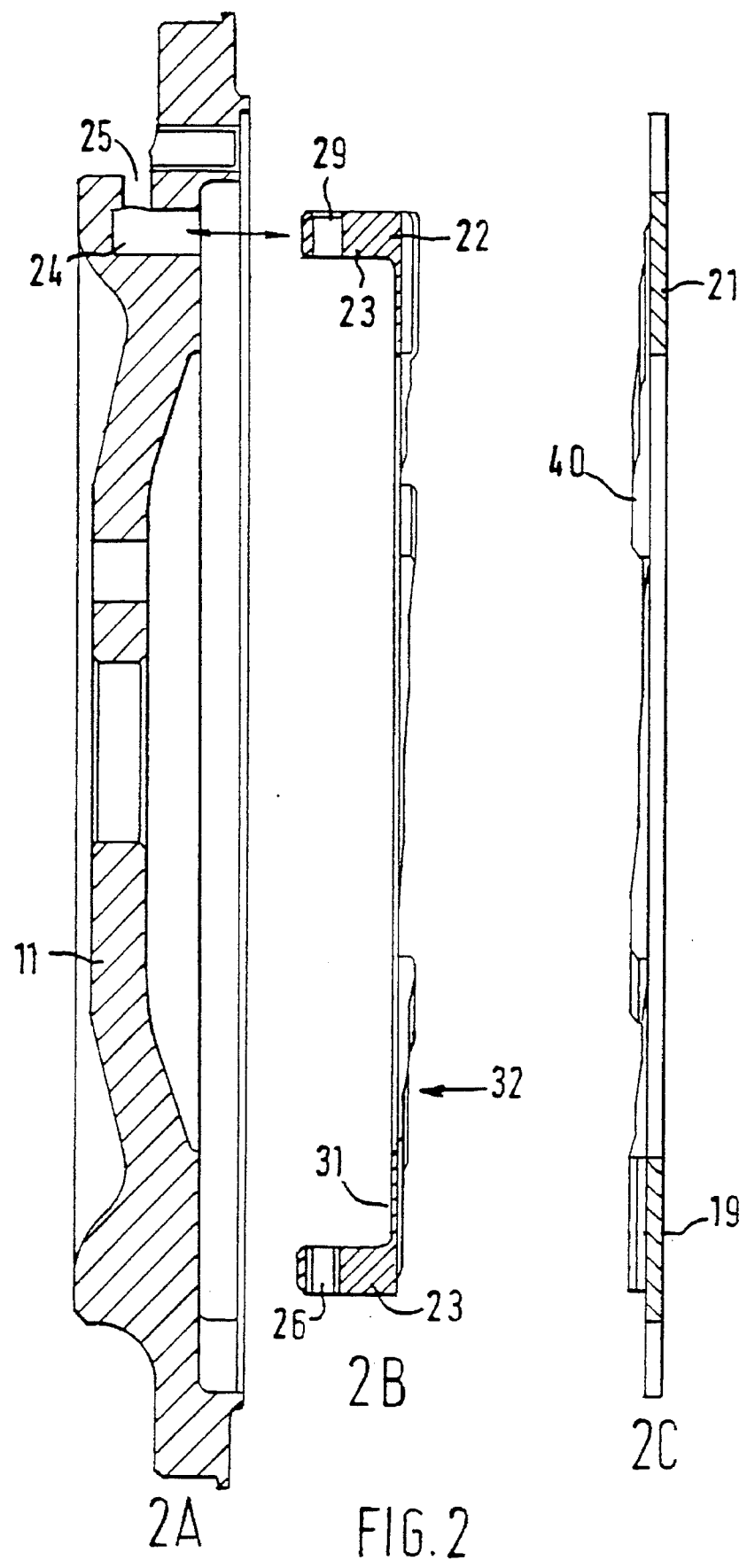
FIGS. 2A, 2B and 2C show exploded sections of the flywheel adjuster means and secondary plate of FIG. 1, FIG. 2A being a section of the flywheel on the line II—II of FIG. 3, FIG. 2B being a section of the adjuster plate on the line III—III of FIG. 6, and FIG. 2C being a section of the secondary plate on the line IV—IV of FIG. 4.
Figure 3:
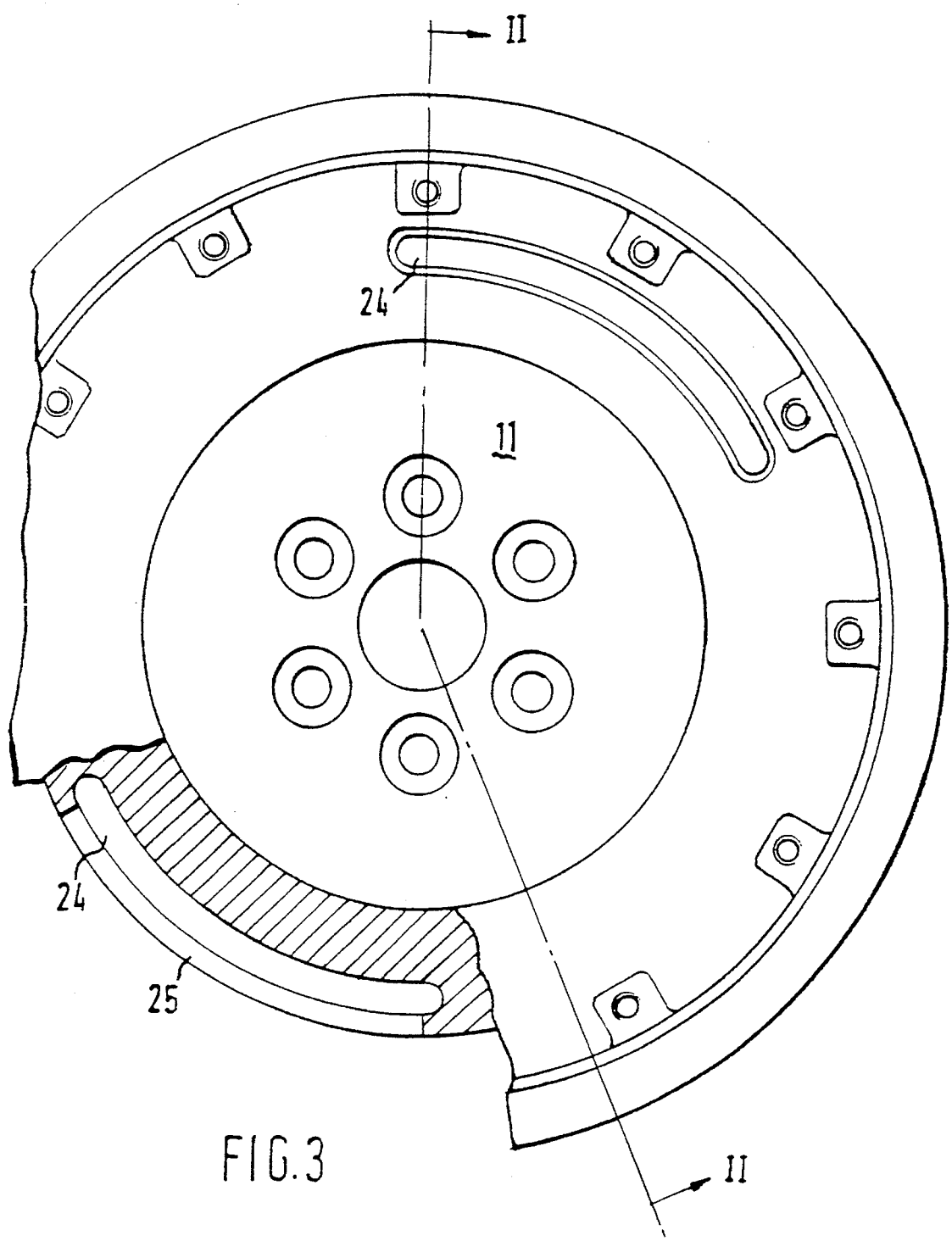
FIG. 3 is a plan view of the flywheel shown in FIG. 2.

With reference to FIGS. 1–7 there is illustrated a multiplate friction clutch 10 comprising a flywheel 11, a cover 12 bolted to the flywheel, and a plurality of friction plates 13 and 14 located within the cover 12. The friction plates 13 are drive plates which engage rotationally fast with the cover but are free to move axially relative to the cover 12. The friction plates 14 are driven plates which are mounted on a hub 15 and are rotationally fast with the hub but are free to move axially relative to the hub. The driven plates 14 are located between pairs of drive plates 13. The friction plates 13 & 14 are preferably formed from carbon-carbon materials.

The stack of friction plates 13 and 14 are biased together by a diaphragm spring 16 mounted on the cover 12. The diaphragm spring 16 acts against a pressure plate 17 which is rotationally fast with the cover 12 and is free to move axially relative to the cover 12 during engagement and disengagement of the clutch. The pressure plate 17 has a friction face 18 that engages the adjacent drive plate 13, and the diaphragm spring bias the pressure plate 17 towards the flywheel 11 and clamps the friction plates 13 and 14 against a friction face 19 associated with the flywheel 11.

The friction face 19 is formed on a secondary plate 21, which in turn abuts against an adjuster means in the form of an adjuster plate 22 which is mounted on the flywheel 11. The flywheel 11, secondary plate 21 and adjuster plate 22 are shown as an exploded assembly in FIGS. 2A, 2B and 2C.

Figure 6:
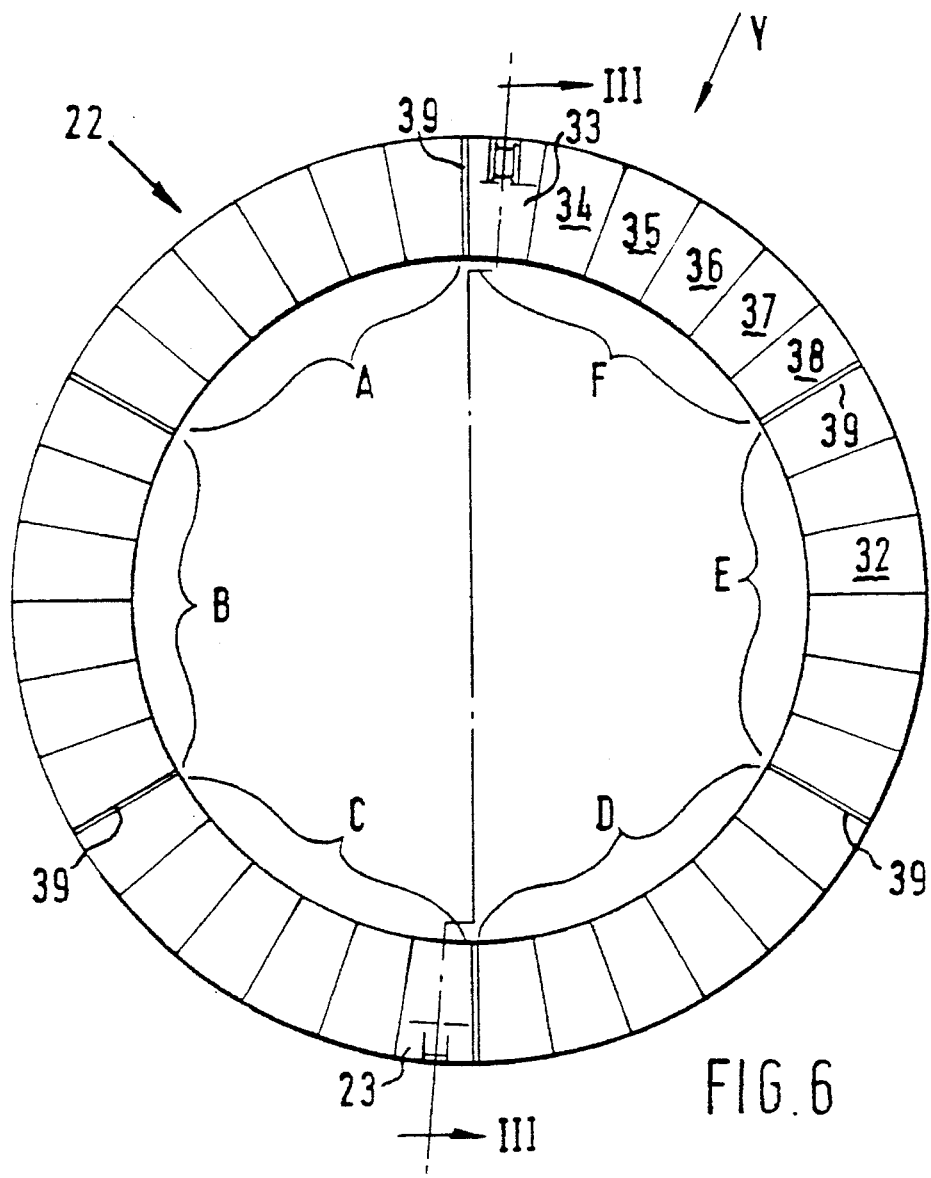
FIG. 6 is a plan view of an adjuster plate of the type used in FIG. 1.
Figure 7:
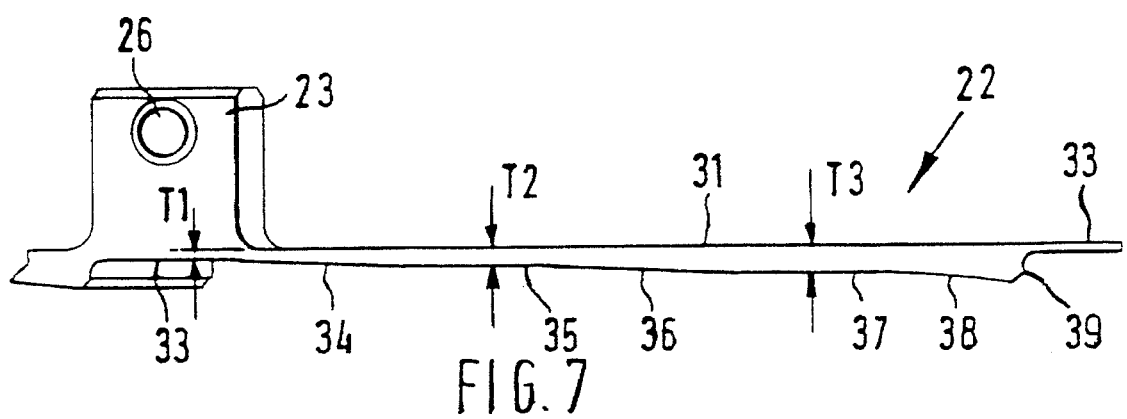
FIG. 7 is an enlarged side view of the adjuster plate taken in the direction of arrow Y of FIG. 6.

The adjuster plate 22 will also be described with reference to FIGS. 6 and 7 and has a pair of lugs 23 spaced on its outer periphery that are diametrically apart and extend axially away from the cover 12. The lugs 23 engage in circumferentially extending arcuate slots 24 in the flywheel 11 (see FIG. 3) so that the adjuster plate 22 is capable of limited angular displacement relative to the flywheel 11. The arcuate slots 24 in the flywheel are open to the peripheral edge of the flywheel through radial slots 25. The adjuster plate 22 can be fixed in selected displacements relative to the flywheel 11 by a grub screw (not shown) passing through a radial slot 25 and engaging in a tapped hole 26 in one lug 23 and can be relatively rotated by insertion of a tool 28 inserted through the other radial slot 25 and engaging in a hole 29 in the other lug 23.

The adjuster plate 22 has a back face 31 in abutment with the flyWheel 11, and its other face 32 comprises six circumferential spaced series A,B,C,D,E and F of inclined ramps. The series A–F of inclined ramps are the same and only one series F will be described with reference to FIG. 6 and 7.

Each series of ramps comprise three circumferentially spaced flat areas 33,35 and 37 which are of increasing thicknesses T1, T2, T3, respectively measured from the back face 31 of the adjuster plate 22. These thicknesses could be 2,3, and 4 mm respectively. The flat areas 33,35, 37 are linked by inclined ramps 34 and 36, with a final inclined ramp 38 adjacent the thickest area 37 extending to an abutment face 39 between the series of ramps 'F' and the adjacent series E.

Figure 4:
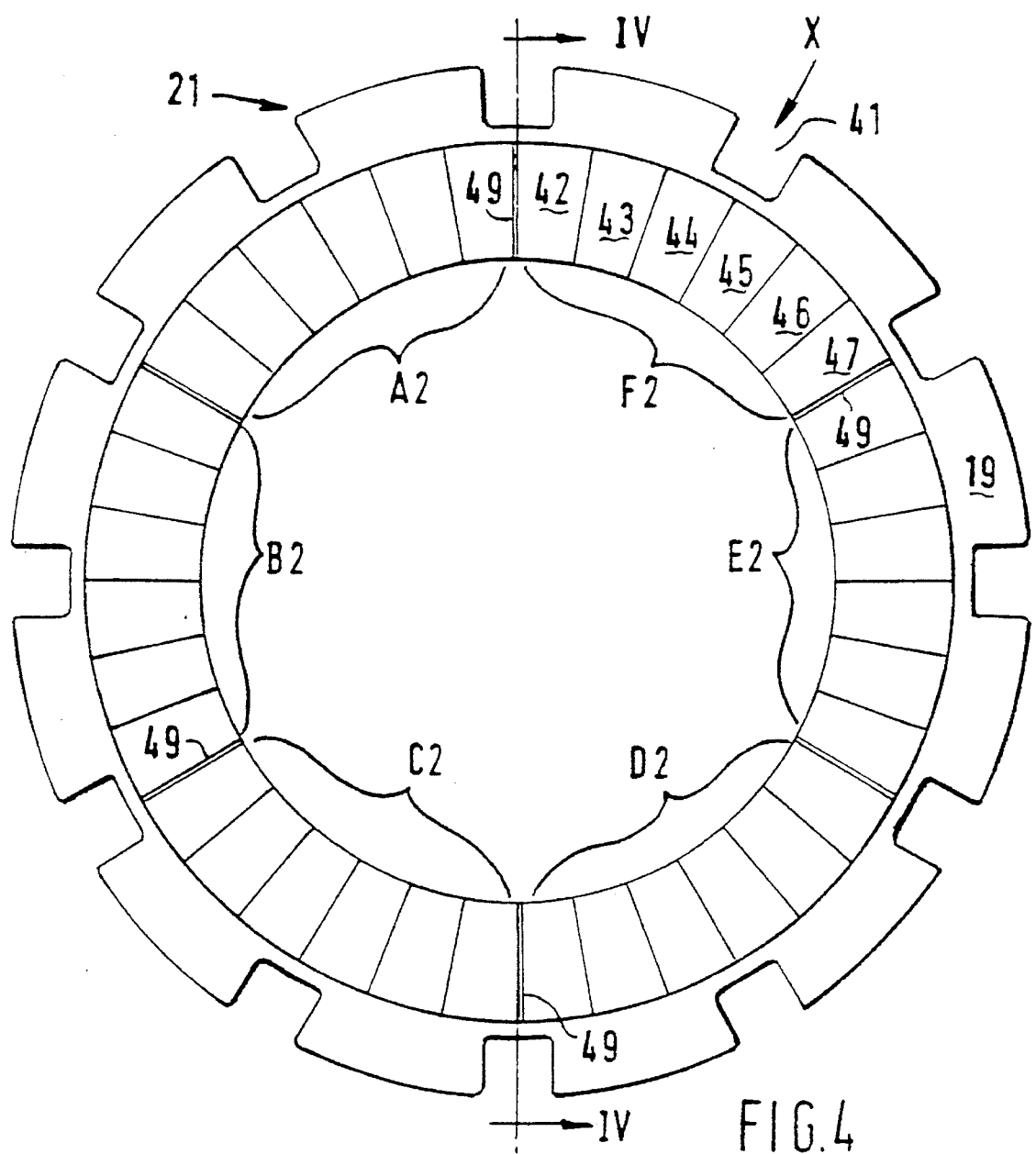
FIG. 4 is a plan view of the secondary plate shown is FIG. 2.
Figure 5:
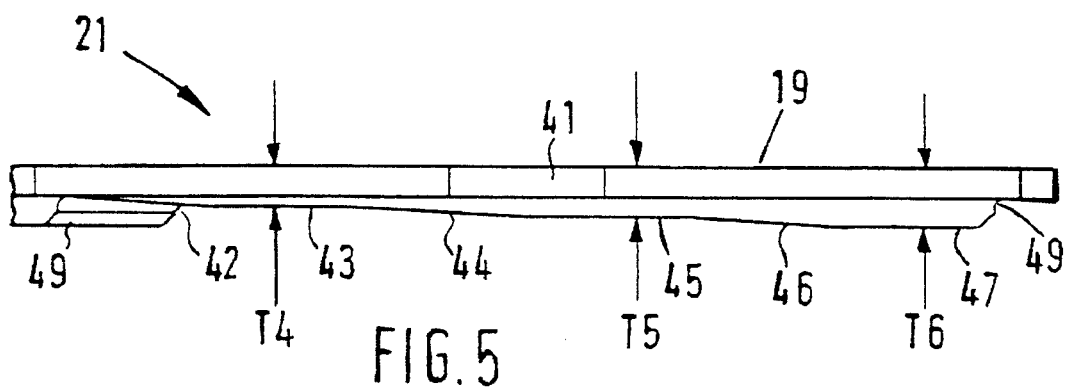
FIG. 5 is an enlarged side view of the secondary plate in the direction of arrow X of FIG. 4.

The secondary plate 21 is shown in FIGS. 4 and 5 and has peripheral slots 41 that engage the flywheel to hold the secondary plate rotationally fast with the flywheel. The face 40 of the secondary plate 21 also comprises six spaced series A2–F2 of inclined ramps that co-operated with the opposed series A–F of ramps on the adjuster plate. The series A2–F2 of the ramps are identical.

The only one series 'F2' will be described with reference to FIGS. 4 and 5. Each series of ramps comprises three circumferentially spaced flat areas 43,45 and 47 which are of increasing thicknesses T4, T5 and T6 respectively measured from the friction surface 19 of the secondary plate 21. These thicknesses would be 2,3 and 4 mm respectively. The flat areas 43,45, and 47 are linked by inclined surfaces 44 and 46, with the inclined surface 42 adjacent the thinnest area 43 lying adjacent an abutment 49 between the adjacent series A2 of ramps.

When the clutch 10 is new the clamping height 'H' (see FIG. 1) is determined between the friction face 18 on the pressure plate 17 and the friction face 19 on the secondary plate 21. As the friction plates 13 and 14 "bed in" and/or wear, the clamping height 'H' between the friction faces 18 and 19 can be monitored electronically or by visual inspection, and when it exceeds predetermined values, the adjuster plate 22 can be rotated relative to the flywheel 11 causing the series of ramps A–F on adjuster plate 22 to ride up the series of ramps on the secondary plate 21 so that the various thickness flat areas 33,35 and 37 on the adjuster plate can engage the various thickness flat areas 43,45 and 47 on the secondary plate so as to axially displace the secondary plate 21 towards the pressure plate 17 thus moving the clamping friction face 19 towards the friction face 18 to compensate for wear in the friction plates in order to maintain the friction face 18 within a predetermined range of axial positions throughout the life of the clutch thus maintaining the designed clamp load of the diaphragm spring 16.

Initially flat areas 33 and 43 are in contact. As the position of pressure plate 17 reaches the limit of the predetermined range so that adjustment is required, adjuster plate 22 is rotated to bring flat areas 35 and 45 into contact. On the next adjustment flat areas 37 and 47 are brought into contact by rotation of adjuster plate 22.

Figure 8:
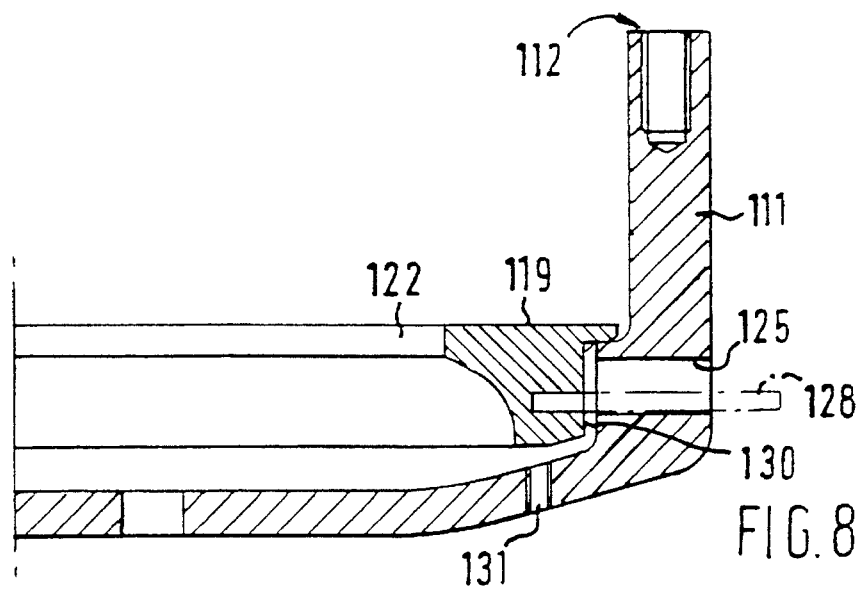
FIG. 8 is a part section through a second multiplate friction clutch flywheel showing a second type of adjuster means.

With reference to FIG. 8, there is illustrated a flywheel 111 for a multiplate clutch of the type in which the friction plates ( not shown ) sit within the flywheel and a flat cover assembly including spring means and pressure plate are fixed to the rim 112 of the flywheel. In this case the secondary plate 122 has a screw thread 130 on its outerperiphery that cooperates with a like screw thread 130 on the inner periphery of the flywheel. The secondary plate is held secured to the flywheel by at least one grub screw (not shown) inserted through at least one respective hole 131 in the flywheel. Adjustment is effected by rotational displacement of the secondary plate using a tool 128 inserted through a radial slot 125 in the flywheel to move the secondary plate 122 along the screw thread to effect axial displacement of the secondary plate. Alternatively, the secondary plate may be provided with a screw thread on its inner periphery which co-operates with a screw thread on the outer periphery of an axially projecting flange located radially within the secondary plate.

Figure 9:
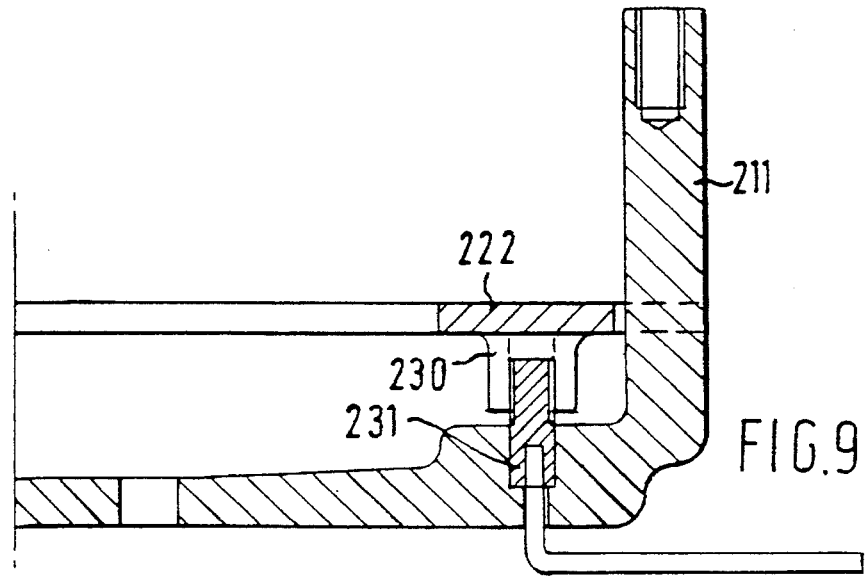
FIG. 9 is a part section through a multiplate friction clutch flywheel of the type shown in FIG. 8 showing yet another type of adjuster means, and FIG. is a part section through a multiplate friction clutch flywheel of the type shown in FIG. 8 showing another type of adjuster means.

With reference to FIG. 9, the multiplate clutch 211 has the secondary plate 222 mounted on the flywheel through at least three circumferentially spaced axial struts 230 which include screwthreaded adjuster means 231 rotatably mounted in the flywheel so that each adjuster means 231 can be rotated to increase the overall length of the screw threaded connection between the flywheel and secondary plate 222 to displace the secondary plate 222 axially for clutch adjustment.

Figure 10:
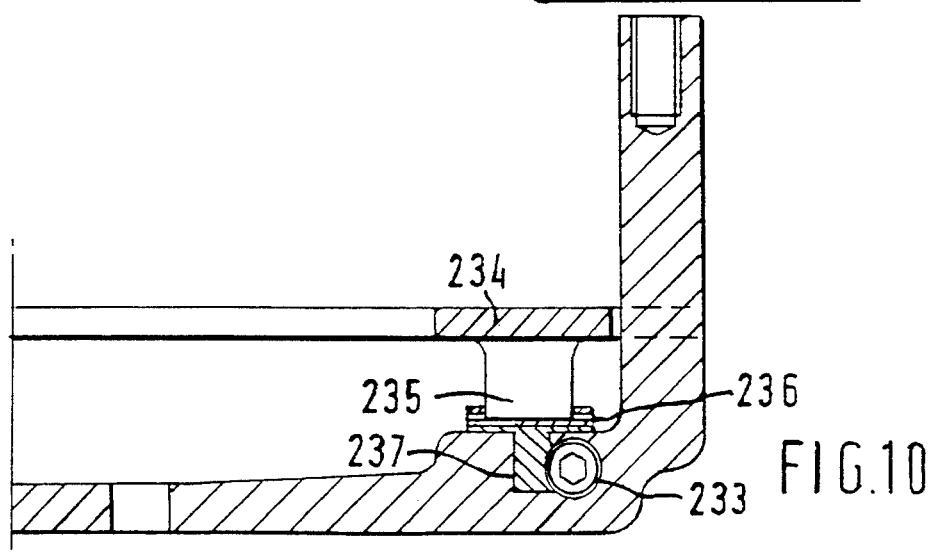

With reference to FIG. 10, the secondary plate 234 is provided with a series of stems 235 which ride up a rotatable series of ramps 236 similar to the adjuster plate 22. The ramps 236 are provided with one or more projections with a rack thereon which are each driven by a worm screw, or pinion teeth on a transverse adjuster screw 233 to rotate ramps 236 and hence adjust the position of secondary plate 234. Screw 233 can be locked in position when the adjustment has been made.

Although in the various constructions described above the secondary means/adjuster means is located between the flywheel and the clutch plates it will be appreciated that the secondary plate/adjuster means constructions described above can be located between the pressure plate and the clutch plates instead of (or in addition to) between the flywheel and clutch plates.

I claim:

1. A friction multiplate clutch, which in use rotates about an axis, comprising a flywheel, a cover fixed to the flywheel, a plurality of friction plates which are biased together by a spring means acting between the cover and a pressure plate to clamp the friction plates together between the flywheel and the pressure plate, wherein a secondary plate is mounted on one of the flywheel or pressure plate adjacent respective friction plate, the secondary plate being a held rotationally fast with the cover and flywheel, and adjuster means located axially between the secondary plate and the flywheel or pressure plate, the adjuster means being capable of selected rotational displacement relative to the flywheel or pressure plate, for axial displacement of the secondary plate relative to the flywheel or pressure plate to compensate for friction plate wear.

2. A multiplate clutch as claimed in claim 1 wherein the secondary plate is mounted axially between the flywheel and the friction plates.

3. A multiplate clutch as claimed in claim 1 wherein the adjuster means is in the form of an adjuster plate having a least one inclined surface thereon which cooperates with an opposed surface on the secondary plate such that relative rotation of adjuster plate to the secondary plate causes the opposed surface to move up the inclined surface thereby axially displacing the secondary plate.

4. A multiplate clutch as claimed in claim 1 wherein there is a plurality of adjuster means each of which rotates about an axis which is not coincident with the said axis of the friction multiplate clutch.

5. A multiplate clutch as claimed in claim 2 wherein the secondary plate is connected to the flywheel through circumferentially spaced adjuster means in the form of axial struts, the overall length of each strut being adjustable.

6. A multiplate clutch as claimed in claim 3 wherein a toothed rack on the adjuster plate engages formations on an adjuster device and rotation of the adjuster device causes rotation of the adjuster plate relative to the secondary plate.

7. A multiplate clutch as claimed in claim 3 wherein there is further provided at least one inclined surface on the secondary plate and the two inclined surfaces move up each other during relative rotation of the secondary plate and adjuster plate.

8. A multiplate clutch as claimed in claim 7 wherein there are three inclined surfaces on each of the secondary and adjuster plates, arranged in series, which are circumferentially spaced by flat areas.

9. A multiplate clutch as claimed in claim 8 wherein the three inclined surfaces are arranged in at least three circumferentially spaced groups each group comprising three inclined surfaces arranged in series.

10. A multiplate clutch as claimed in claim 1 wherein the adjuster means can be held in selective rotational displacement relative to the fly wheel by means of lugs on the adjuster means engaging in circumferentially elongated slots in the flywheel, the lugs being secured to the flywheel in selected displacements by screw means.

11. A multiplate clutch as claimed in claim 2 wherein the secondary plate is mounted by screw adjustable means.

12. A multiplate clutch as claimed in claim 11, wherein the screw adjustable means comprises a screw thread on the outer peripheral edge of the secondary plate which engages a complimentary screw thread on a radially inner surface of the flywheel within which the secondary plate is mounted.

* * * * *